UNITED STATES PATENT OFFICE.

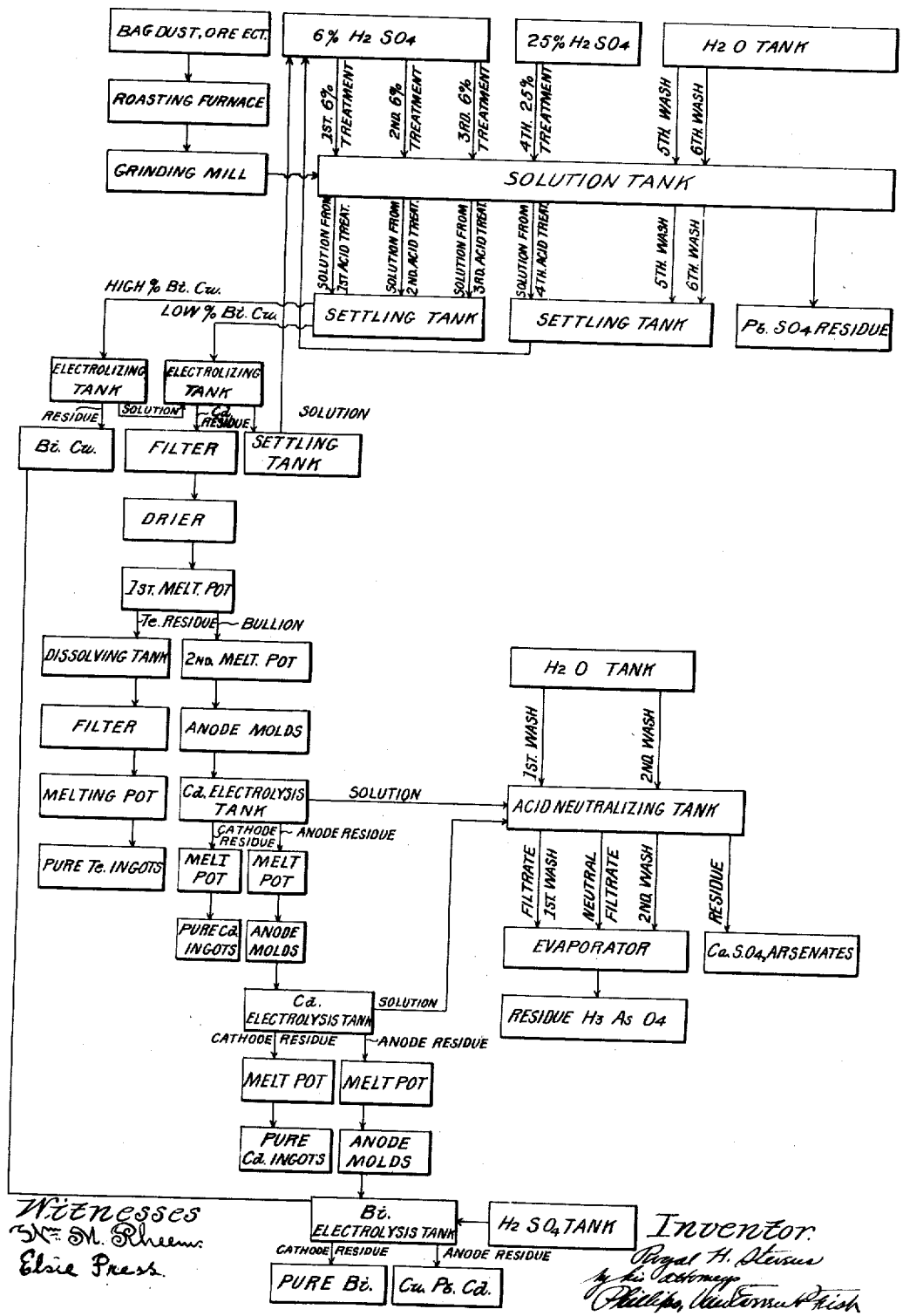

ROYAL H. STEVENS, OF SALT LAKE CITY, UTAH, ASSIGNOR TO UNITED STATES SMELTING, REFINING & MINING COMPANY, OF PORTLAND, MAINE, A CORPORATION OF MAINE.

PROCESS FOR SEPARATING METALS.

1,194,438.      Specification of Letters Patent.     Patented Aug. 15, 1916.

Application filed November 20, 1912. Serial No. 732,402.

*To all whom it may concern:*

Be it known that I, ROYAL H. STEVENS, a citizen of the United States, residing at Salt Lake City, in the county of Salt Lake and State of Utah, have invented certain new and useful Improvements in Processes for Separating Metals; and I do hereby declare the following to be a full, clear, and exact description of the invention, such as will enable others skilled in the art to which it appertains to make and use the same.

The present invention relates to a process for separating metals, and more particularly to a process for separating the metal cadmium from ores, furnace products, flue dusts, bag house dusts, and the like.

The present invention also relates to the separation of metals, such as bismuth and tellurium and the separation of arsenic acid which may be contained in the materials treated from cadmium.

In the accompanying drawing is shown a diagram illustrating the component parts of a plant in which the several reactions are carried out. The connections between the various parts showing the steps of the advance of the components in making them available as individual components are shown in their various relations.

In order to present the present invention in a form in which it may be most readily understood, the process will first be outlined, and then described more specifically and in greater detail as applied to a specific material.

The outline of the process is as follows:—
The ore, furnace products, flue dust, bag house dust or the like is first roasted to a dead roast for the purpose of converting all cadmium sulfid into cadmium oxid, of volatilizing all volatile arsenic compounds, and of converting all non-volatile arsenic compounds into their corresponding arsenic acid compounds. The material is then ground or pulverized to any desired mesh. The pulverized material is then placed in a solution tank, preferably a revolving tubular lead-lined tank. Dilute sulfuric acid is then run into the tank. The solution and material are agitated until all the available sulfuric acid is consumed. The solution is then drawn off into containers. The material is treated with fresh dilute sulfuric acid one or more times to dissolve more of the cadmium. To dissolve the remaining cadmium, the material is then treated with a stronger solution of hot sulfuric acid. This strong acid is drained off and used for making weaker acid for treating fresh material. The material is finally washed with water. This water is usually added to the strong acid solution for diluting it to the proper strength for treating fresh material. The clear solution containing the cadmium is led into electrolyzing tanks. If the solution contains any considerable amount of copper, bismuth, tellurium and the like, it is electrolyzed at a voltage preferably from 1.8 to 2.1 volts until most of the bismuth and copper are deposited on the cathodes, leaving the cadmium in the solution. The sulfuric acid solution obtained by treating the ground material with sulfuric acid, or in case copper, bismuth, tellurium and the like are present, the same sulfuric acid solution, after it has been electrolyzed to remove these metals, is led into an electrolyzing tank or tanks which are provided with easily removable false bottoms. The electrolysis is carried on at a voltage from 2.2 to 3.4 with a current density of from .01 to .05 ampere per square inch until the cadmium is deposited from the solution. The cadmium will be deposited upon the cathode in a coherent form, or will be partially deposited on the cathode in a coherent form and partially fall from the cathode in a non-coherent form to the false bottom, or practically all fall from the cathode in a non-coherent form to the bottom, depending upon the composition of the solution. The solution resulting from the cadmium electrolysis is treated for the separation of the arsenic acid contained in it. The cadmium from the cathode or from the false bottom or both is filter-pressed and dried, after which it is melted under dry sodium hydroxid and powdered charcoal at a temperature of about 400 degrees centigrade. The arsenic and tellurium which may be present with the cadmium are dissolved in the fused sodium hydroxid. The flux formed by the sodium hydroxid and the tellurium and arsenic is dissolved in water and a current of air is blown through the solution, which causes the tellurium to be precipitated in a metallic state. The precipitate is washed, dried and cast for marketing.

The cadmium bullion which is drawn off from beneath the sodium hydroxid flux is cast into anode plates preparatory to a further electrolytic purification. Metallic copper or metallic cadmium plates are used as cathodes, and the electrolysis is carried on in a solution of cadmium sulfate, sulfuric acid and a soluble salt of sulfocyanic acid, preferably an alkaline sulfocyanate. The solution is electrolyzed at approximately .4 volt with a current density at approximately 5 amperes per square foot. The solution is preferably agitated during electrolysis so that a coherent coating of cadmium is formed on the cathode. By this process, pure cadmium is deposited on the anode, while copper, bismuth and lead which may be contained in the impure cadmium bullion remain in the anode sludge. The sulfocyanate prevents the copper from going into solution with little or no consumption of the sulfocyanate. The lead is prevented from going into solution by the sulfuric acid. The solution must contain a small amount of free sulfuric acid or the cadmium will not be deposited on the cathode in a coherent form. The acidity of the solution is preferably maintained by placing in each end of the electrolyzing tank an insoluble anode and a copper or cadmium cathode. These electrodes are connected to an independent circuit of about 2.5 volts in which the current is regulated so that sufficient cadmium will be precipitated to maintain the proper acidity of the solution. Some provision must be made to maintain the proper acidity, because more cadmium is dissolved at the cadmium bullion anodes than is required by the electric current. The refined cadmium deposited on the cathodes is melted under sodium hydroxid or paraffin and cast for marketing. The anode sludge contains quite a proportion of cadmium so that it is remelted and cast into anode plates, and more of the cadmium is electrolytically refined. The sludge resulting from the second refining process will be comparatively low in cadmium and high in copper, bismuth and lead. To separate the bismuth, this sludge is again remelted and cast into anode plates and is electrolyzed in a bath of bismuth sulfate, sulfuric acid, and a soluble salt of sulfocyanic acid, preferably an alkaline sulfocyanate, together with sufficient glycerol to clarify the solution. The remelted sludge forms the anode, and a metallic copper plate forms the cathode. The electrolysis is carried on at a voltage of about .4 volt at a current of approximately 3 amperes per square foot. The bismuth is deposited in a pure state at the cathode.

The process will now be described with greater detail particularly with reference to the treatment of bag house dust, which has approximately the following composition:—

| | | |
|---|---|---|
| Pb | Lead, metal free | 2.20 |
| PbO | Lead oxid | 21.34 |
| PbS | Lead sulfid | 7.04 |
| PbSO₄ | Lead sulfate | 11.34 |
| As | Arsenic, metal free | 3.71 |
| As₂O₃ | Arsenic trioxid | 16.12 |
| As₂O₅ | Arsenic pentoxid | 2.92 |
| AsCl₃ | Arsenic tri-chlorid | 9.42 |
| CdO | Cadmium oxid | 1.60 } 12.04% Cd. |
| CdS | Cadmium sulfid | 13.68 |
| CaO | Calcium oxid | 3.15 |
| CaSO₄ | Calcium sulfate | 0.50 |
| Sb₂O₃ | Antimony tri-oxid | 1.05 |
| Bi₂O₃ | Bismuth tri-oxid | 0.45 |
| Fe₂O₃ | Iron tri-oxid | 0.94 |
| Tl₂O₃ | Thallium trioxid | 0.08 |
| CuO | Copper oxid | 0.10 |
| ZnO | Zinc oxid | 1.37 |
| SiO₂ | Silicon di-oxid | 0.95 |
| CO₂ | Carbon di-oxid | 0.57 |
| C | Carbon, free | 0.38 |
| Te | Tellurium, metal free | 0.94 |
| Se | Selenium | Tr. |
| Total | | 99.85 |

The dust is first carefully roasted in a reverberatory roasting furnace or a Brunton arsenic furnace connected with chambers in which the volatilized arsenic-tri-oxid which is expelled during the roasting process is condensed. The temperature at which the dust is roasted is not greater than a dull red heat, so that the cadmium chlorid which is formed during the roasting process is not volatilized. The following chemical reactions are believed to take place during the roasting:— The cadmium sulfid combines with a portion of the arsenous chlorid according to the following equation:—

$$6CdS + 4AsCl_3 + 9O_2 = 6CdCl_2 + 2As_2O_3 + 6SO_2$$

Other chlorids are also formed according to the following equation:—

$$3CaO + 2AsCl_3 = 3CaCl_2 + As_2O_3$$

The greater portion of the contained cadmium sulfid is converted into its corresponding oxid according to the following equation:—

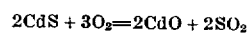
$$2CdS + 3O_2 = 2CdO + 2SO_2$$

The contained metallic arsenic is oxidized into arsenous acid as follows:—

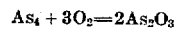
$$As_4 + 3O_2 = 2As_2O_3$$

A portion of the arsenic-tri-oxid is volatilized and the remaining portion retained by the basic oxids present, such as lead oxid, cadmium oxid, calcium oxid, etc., interacting with the oxygen of the air to form their corresponding arsenic acid compounds, as follows:

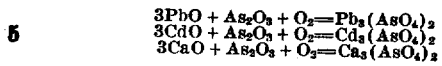

The roasted product has approximately the following composition:—

| | | |
|---|---|---|
| PbSO₄ | Lead sulfate | 19.24% |
| Pb₃(AsO₄)₂ | Lead arsenate | 43.07 |
| Cd₂O₄ | Cadmium sulfate | 3.41 |
| CdCl₂ | Cadmium chlorid | 4.38 |
| Cd₃(AsO₄)₂ | Cadmium arsenate | 9.07 |
| CdO | Cadmium oxid | 4.62 |
| CaSO₄ | Calcium sulfate | 2.34 |
| CaCl₂ | Calcium chlorid | 1.15 |
| Ca₃(AsO₄)₂ | Calcium arsenate | 2.28 |
| CaO | Calcium oxid | 1.02 |
| Sb₂O₃ | Antimony tri-oxid | 0.72 |
| Bi₂O₃ | Bismuth tri-oxid | 0.53 |
| Fe₂O₃ | Iron tri-oxid | 1.13 |
| Tl₂O₃ | Thallium tri-oxid | 0.10 |
| CuO | Copper oxid | 0.13 |
| ZnO | Zinc oxid | 1.55 |
| SiO₂ | Silicon di-oxid | 1.15 |
| TeO₂ | Tellurium di-oxid | 1.47 |
| As₂O₃ | Arsenic tri-oxid | 0.15 |
| Cl | Chlorin (as chlorid—chemical combination undetermined) | 2.43 |
| | Total | 99.94 |

The roasted material is then ground to pass through a 10-mesh screen. The ground material is then fed into a lead-lined chlorination barrel. On a basis of one ton of material, the barrel is about three-and-one-half feet in diameter by five feet long and is filled about one-third full with the ground material. Hot dilute sulfuric acid is then run into the barrel, preferably about 2,000 pounds of a 6% sulfuric acid solution. The material and acid are thoroughly mixed by revolving the barrel for about an hour. Within the hour all of the available sulfuric acid is consumed. The following chemical reactions are believed to take place:—

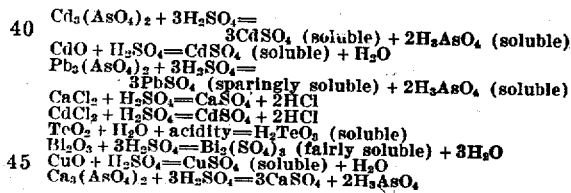

After the treatment of the material with the 6% solution, the insoluble matter is allowed to settle and the solution is siphoned through a lead pipe into a settling tank. The above operation is twice repeated with fresh 6% solutions of hot sulfuric acid, about 1500 pounds being used for each treatment. The acid in the material is thoroughly agitated and mixed as before, and the solution run into the settling tank. About 5000 pounds of 6% sulfuric acid solution is used. Of this about 4500 pounds is drawn off and about 500 pounds is retained by the wet material in the barrel. After the above treatment with the 6% acid solution, about 1250 pounds of 25% solution of sulfuric acid is run into the barrel and the acid and material are agitated for about one hour and a half. Then, the solution is siphoned into a separate settling tank. This 25% solution of sulfuric acid dissolves all of the remaining available cadmium. Then, the material is washed twice with water, about 500 pounds of water being used for each washing. The water is siphoned into the settling tank which contains the 25% sulfuric acid with which the material has been treated. The 25% sulfuric acid with the wash water is diluted for use in the first treatment of the next charge of fresh material.

Returning to the 6% sulfuric acid solution with which the material has been treated, this solution contains cadmium sulfate $(CdSO_4)$, arsenic acid $(H_3AsO_4)$ copper sulfate $(CuSO_4)$, compounds of bismuth, tellurium, etc., together with dissolved quantities of lead sulfate $(PbSO_4)$, calcium sulfate $(CaSO_4)$, limited by the solubility of these compounds in the solution.

As the analysis of the roasted material shows that it contains but a small percentage of soluble metallic impurities, such as copper, bismuth, tellurium, arsenous acid and the like, the first electrolyzing process which was indicated in the foregoing brief outline of the invention, for the purpose of removing the copper, bismuth, tellurium, etc., is omitted. While this step is omitted in the treatment of a bag house dust, which like the bag house dust shown in the above analysis contains small quantities of copper, bismuth, tellurium, etc., it is to be understood that a material which contains notable quantities of copper, bismuth, tellurium, etc., is to be electrolyzed at a low voltage (about 2 volts) to separate the greater portion of these metals.

Returning again to the 6% sulfuric acid solution obtained from the treatment of the ground material,—this solution is led through lead pipes into electrolyzing tanks which are provided with connections to an electric generator. The dimensions of the tanks which are preferably employed are about six inches wide by six inches deep by ten feet long. The tanks are provided with easily removable false bottoms, which may be withdrawn at one end after the solution is drawn off when the electrolysis is completed. The tanks are provided with electrodes, arranged in multiple at a distance of about one-half inch apart. Platinum-plated tungsten anodes and sheet copper cathodes are employed. The platinum-plated tungsten anodes which are preferably employed are described in Letters Patent No. 1,077,894, issued to R. H. Stevens, November 4, 1913. The solution is electrolyzed at a voltage of about 3.2 volts and a current density of about six amperes per square foot. The electrolysis is allowed to proceed until there is an abundant evolution of hydrogen at the copper cathode, which usually takes place in about eight hours, when the deposition is complete. In a solution like the solution which is being considered in the present specific case, which contains such notable quantities of arsenic acid, the cadmium is deposited in a non-coherent form, and detaches itself from the copper cathode and falls onto the false bottom of the tank. The solution is not agitated so that the liberated sulfuric acid ascends to the upper strata of the solution and so that a minimum quantity of arsenic acid comes in contact with the deposited cadmium, because in the presence of sulfuric acid and arsenic acid, arsenic as precipitated and cadmium is dissolved according to the following equation:—

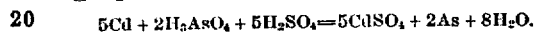

$$5Cd + 2H_3AsO_4 + 5H_2SO_4 = 5CdSO_4 + 2As + 8H_2O.$$

With solutions which are comparatively free from interfering impurities, a good coherent deposit of cadmium can be readily separated on the copper cathode, when the solution is agitated with air or the tanks are arranged in cascade system, allowing this solution to flow from one tank to the other. By means of the above electrolysis, a deposit of cadmium together with copper, bismuth, lead, tellurium and a variable amount of metallic arsenic is obtained. The solution contains arsenic acid together with all sulfuric acid liberated by the electrolysis. After the electrolysis is completed, the solution is drawn off from the electrolyzing tanks through lead pipes, which open from the tanks at about the level of the tops of the false bottoms. After the solution is discharged, the false bottoms are withdrawn onto filter cars, the dimensions of which are a little greater than the false bottoms. The cadmium precipitate and the solution which is with it, are emptied onto filter cloths with which the filter cars are provided and the solution is allowed to drain off, leaving the cadmium precipitate with its precipitated impurities. The precipitate is filter-pressed and air dried. Then the dried precipitate is melted down under powdered sodium hydroxid in a covered iron vessel. The iron vessel has a small iron pipe leading from its bottom into a second iron pot below the first pot into the bottom of which the pipe discharges. The second pot contains a quantity of fused sodium hydroxid. The first pot is charged with about 100 parts of the dried impure cadmium, 15 parts of powdered sodium hydroxid and 3 parts of powdered charcoal. The pots are heated to about 400 degrees centigrade for about one-half hour, or until all sparking which is due to expelled hydrogen has ceased. After the fusing is completed in the first pot, the melted cadmium bullion is drained through the iron pipe into the second pot, which contains sufficient sodium hydroxid to cover the cadmium bullion. The fused cadmium bullion in the second pot is well stirred with a wooden paddle for about fifteen minutes. During the stirring operation, powdered charcoal is spread over the surface of the fused sodium hydroxid. Then, the melted cadmium is siphoned through an iron pipe into anode molds to make ingots about 36 inches wide by 18 inches high by one-half inch thick. The cadmium bullion which is cast into the ingots contains from 94 to 97% of cadmium, the remaining impurities comprising bismuth, lead and copper. The sodium hydroxid with which the melted bullion was covered forms a flux which contains all of the tellurium as sodium tellurid, and all of the arsenic as sodium arsenid. The cadmium is refined from the impure ingots by electrolysis in a bath of cadmium sulfate made slightly acid with sulfuric acid, and containing a small amount of a soluble salt of sulfocyanic acid, preferably an alkaline sulfocyanate, such as potassium or sodium sulfocyanate. The electrolyte is preferably a water solution containing 10% cadmium sulfate ($CdSO_4$), $\frac{1}{2}$ of 1% sulfuric acid ($H_2SO_4$) and $\frac{1}{4}$ of 1% potassium sulfocyanate (KSCN). The refining tanks are connected with an electric generator, and are preferably arranged in series so that there is a potential drop of about .4 volts for each tank. The potential difference between the electrodes is therefore about .4 of a volt and current density of from 4 to 6 amperes per square foot is maintained. For the purpose of agitating the solution, the tanks are arranged in a cascade system with one tank placed a few inches lower than the preceding one so that the solution can flow from one tank to another. The tanks are provided with trays for receiving all detached anode sludge. The electrodes are arranged in multiple about 2¼ inches apart. The cadmium ingots serve as the anodes and sheet copper plates are used as cathodes. The cathode area is equal to the anode area. At one or both ends of each of the tanks is placed a platinum-plated tungsten anode together with a copper cathode to form an auxiliary circuit for maintaining the acidity of the solution. The platinum-plated tungsten anode and the copper cathode are connected to an independent circuit of about 2½ to 3 volts. The current used for the auxiliary circuit or circuits in each tank is equal to about 8% of the current used in each tank for refining the cadmium. The platinum-plated tungsten electrode does not dissolve and the cadmium is deposited on the anode, so that this auxiliary circuit produces free sulfuric acid. It is necessary to maintain the electrolyte in an acid condition (preferably not below ½ of 1% sulfuric acid), because if the solution becomes neutral, the cadmium is deposited in a non-coherent form. It is therefore necessary to provide some means for maintaining the acidity of the solution, because the solution tends to rapidly become neutral because more cadmium goes into solution at the cadmium anodes than is required by the refining current.

The pure cadmium is deposited in a coherent form on the copper cathodes. The impurities, which existed in the impure cadmium bullion anodes, such as copper, bismuth and lead, remain in the anode sludge in their metallic state and do not become a source of impurity in the electrolyte. The cadmium is allowed to deposit on the copper cathodes until it becomes about one-eighth of an inch thick. It is then easily stripped off, melted down under sodium hydroxid or paraffin and cast in iron molds for marketing. The anode sludge contains a considerable amount of cadmium, sometimes as high as 60% cadmium to 40% bismuth, copper and lead. To separate the remaining cadmium, the sludge is remelted and recast into ingots and again electrolytically refined in a manner similar to the process of refining the cadmium bullion ingots which has just been described. The anode sludge from the second electrolytic refining process contains a very much lower percentage of cadmium, and is treated to separate the bismuth. The sludge is melted and cast into ingots about 12 inches wide by 9 inches deep by ½ inch thick and is electrolytically refined in an electrolyte containing bismuth sulfate, sulfuric acid, a soluble salt of sulfocyanic acid and glycerol. The electrolyte is preferably a water solution of 2 to 3% bismuth sulfate, $Bi_2(SO_4)_3$, 1% sulfuric acid ($H_2SO_4$) and 1% potassium sulfocyanate (KSCN) together with sufficient glycerol to clarify the solution. The electrolysis is carried on at about .4 volt with a current density of about 3 amperes per square foot. The ingots are used for the anodes, and sheet copper plates for the cathodes. The pure bismuth is deposited upon the copper cathodes. The copper, lead and part of the cadmium are left in the anode sludge. Part of the cadmium enters into the solution consuming sulfuric acid. Consequently, fresh acid must be added from time to time to maintain the acidity of the solution or the acidity may be maintained by an auxiliary acid forming circuit. As the solution in time becomes contaminated with cadmium sulfate ($CdSO_4$), the electrolyte should be treated for the contained bismuth by electrolyzing at a voltage of about 2 volts, and the new electrolyte made up in the proportions given above.

Returning to the solution which remained after the first cadmium electrolysis,—this solution is preferably reused for treating the fresh roasted and ground materials, so that it contains the arsenic acid resulting from two treatments of the roasted material. After the reused solution has passed a second time through the first electrolysis employed in the separation of cadmium, it is agitated with a slight excess of powdered lime to neutralize all of the contained sulfuric acid. A precipitate of calcium sulfate ($CaSO_4$) and the arsenates of the impurities existing in the solution is obtained, leaving pure arsenic acid in solution. After the precipitate has settled, the supernatant liquid is decanted into evaporators. The precipitate is then washed twice and the wash water decanted into the main solution in the evaporators. This arsenic acid solution is evaporated in evaporating tanks about 10 feet long by 4 feet wide by 1 foot deep provided with a series of one-inch lead pipes running from one end of the tank to the other and placed about two inches above the bottom of the tank. Hot gases from any available source of waste heat or from the combustion of coal, gas or crude oil are led through these lead pipes to heat the solution. The solution is allowed to evaporate until it reaches a concentration of about 85% arsenic acid or a specific gravity of 2.18 at 15 degrees centigrade, or the solution may be evaporated to dryness to obtain solid arsenic acid.

Returning to the flux which is formed by the absorption in the tellurium and arsenic in the fused sodium hydroxid which covers the melted cadmium bullion,—the flux is poured onto an iron plate to solidify and is then broken into small pieces. The crushed flux is dissolved in water in a porcelain vessel. The solution is agitated to allow a maximum amount of air to come into contact with the dissolved sodium tellurid, preferably by means of a current of air blown through the solution. The air causes a complete precipitation of tellurium in a metallic state. The deposit of tellurium is allowed to settle and the supernatant solution is decanted. The tellurium is washed several times with water and the wash water decanted off. Finally, the metallic tellurium is filtered through a cloth filter bag and dried. It is then melted down in airtight clay molds heated to about 500 degrees centigrade into ingots for marketing.

While the process which constitutes the present invention has been carefully outlined and then specifically described, it is to be understood that the process does not necessarily include all of the steps mentioned or that the steps need be carried out exactly as outlined, but is susceptible of modifications and changes within the purview of the invention as particularly pointed out in the following claims.

I claim—

1. The process of separating metals from ores and like material containing cadmium, bismuth, copper, lead, tellurium, arsenic and similar metals consisting in oxidizing the ore and dissolving in sulfuric acid, electrolyzing the resulting sulfates at a low voltage to separate bismuth and copper therefrom, electrolyzing the solution remaining from the first electrolytic bath at a different voltage to deposit a cadmium residue therefrom, fluxing and melting said residue to separate tellurium, casting the bullion resulting from the reduced residue, electrolyzing the bullion in a cadmium electrolyte to separate pure cadmium, separating and melting the cadmium sludge resulting from the bullion electrolysis, and casting into plates, reëlectrolyzing the cadmium sludge plates in a cadmium electrolyte to abstract pure cadmium, separating and melting the bismuth residue from the cadmium bullion electrolysis, and casting into plates, electrolyzing the bismuth residue plates in a bismuth electrolyte to separate pure bismuth from a copper, lead and cadmium residue.

2. The process of separating metals from ores and the like material containing cadmium, bismuth, tellurium, lead and the like metals, comprising roasting the ore to oxidize and drive off volatile materials, dissolving in sulfuric acid, electrolyzing the sulfate solution to deposit a cadmium residue, separating, fluxing and melting said residue to separate tellurium therefrom, casting the cadmium bullion from the fluxed residue, electrolyzing the bullion in a cadmium electrolyte to deposit pure cadmium at the cathode, separating the electrolyte from the cathode and anode residues for neutralization to obtain arsenic acid, melting the anode and cathode residue from the bullion electrolysis and casting into plates, electrolyzing the anode residue casting in a cadmium electrolyte to separate pure cadmium at the cathode, separating the electrolyte from the cathode and anode residues for treatment with the bullion electrolysis electrolyte, melting the bismuth anode and cadmium cathode residue from the bullion anode residue electrolysis and casting, and electrolyzing the bismuth anode residue casting in a bismuth electrolyte to separate pure bismuth from the remaining metals.

3. The process of separating metals from ores and the like material containing cadmium, bismuth, copper, tellurium, lead and like metals comprising roasting the ore, dissolving in sulfuric acid, electrolyzing the sulfate solution to get a cadmium residue, fluxing and melting said residue to separate tellurium therefrom, casting the cadmium bullion from the fluxed residue, electrolyzing the bullion in a cadmium electrolyte to separate pure cadmium at the cathode, melting the anode residue from the bullion electrolysis and casting, electrolyzing the anode residue casting in a cadmium electrolyte to separate pure cadmium at the cathode, melting the bismuth residue from the bullion anode residue electrolysis and casting, electrolyzing the bismuth residue casting in a bismuth electrolyte to separate pure bismuth from the remaining metals.

4. The process of separating metals from ores and the like material containing cadmium, bismuth, copper, lead, arsenic, tellurium, &c., comprising roasting the ore to oxidize and expel volatile compounds, dissolving in a mineral acid, electrolyzing the acid solution to deposit a cadmium containing residue, fluxing and melting the cadmium containing residue to separate tellurium therefrom, casting the tellurium free residue into ingots, electrolyzing the ingots to separate pure cadmium at the cathode and a cadmium containing residue at the anode, removing the electrode deposits, melting and casting said anode residue into ingots and reëlectrolyzing in a cadmium electrolyte to obtain pure cadmium at the cathode and a bismuth containing residue at the anode.

5. The process of separating metals from ores and like material containing cadmium, bismuth, copper, lead, tellurium, arsenic, &c., comprising oxidizing the ore, dissolving in an acid, electrolyzing the solution to obtain a cadmium containing residue, separating and drying the residue, fluxing the residue with sodium hydroxid and carbon to separate tellurium in the slag from the cadmium residue.

6. The process of separating metals from ores and the like material containing cadmium, bismuth, copper, lead, tellurium, arsenic and like metals comprising roasting the ore and dissolving in an acid, electrolyzing the solution to get a cadmium residue, fluxing and melting the cadmium residue to free of tellurium, casting and electrolyzing the tellurium free residue to separate pure cadmium.

7. Process of separating metals from the ores and the like material containing cadmium, bismuth, copper, lead, arsenic and the like metals comprising dissolving the ore in a mineral acid, electrolyzing the acid solution to deposit metals, separating and drying the deposited metals, fluxing and melting the dried metals and casting into a bullion, electrolyzing the bullion in a cadmium electrolyte to separate pure cadmium from the remaining metals.

8. Process of separating metals from ores and like material containing cadmium, bismuth, copper, lead and similar metals comprising oxidizing the ore, dissolving in sulfuric acid, electrolyzing the sulfate, melting and fluxing the cadmium containing cathode deposit, casting the melted cathode deposit, electrolyzing the casting cathode deposit in a cadmium electrolyte, melting the cathode deposit from the cadmium electrolyte electrolysis to obtain the pure cadmium.

9. In the process of separating metals from ores and like material containing cadmium, bismuth, lead, copper, tellurium, arsenic, &c., comprising roasting the ore, dissolving the ore in sulfuric acid, electrolyzing the sulfate solution to obtain a cadmium containing residue, melting and fluxing the residue with sodium hydroxid and charcoal to separate the tellurium in the slag, casting the tellurium separated bullion, electrolyzing the bullion to separate pure cadmium at the cathode, drying the anode residue to recover cadmium and bismuth, neutralizing the electrolyte of the bullion electrolysis, filtering the neutralized electrolyte and evaporating the filtrate to obtain arsenic acid.

10. That step in the process of separating metals from ores and the like material containing cadmium, bismuth, copper, tellurium, lead and the like metals comprising electrolyzing a solution of the metals in an electrolyte, comprising cadmium sulfate, sulfuric acid and an alkali sulfocyanate.

11. That step in the process of separating metals from ores and the like material containing cadmium, bismuth, copper, lead, arsenic, tellurium and the like metals, comprising electrolyzing an acid solution of the metals at a low voltage to remove bismuth and copper therefrom, then reëlectrolyzing at a higher voltage to deposit metals.

12. That step in the process of separating metals from ores and the like material containing cadmium, bismuth, lead, copper, arsenic, etc., comprising electrolyzing an acid solution of the metals at a low voltage to remove bismuth and copper, then reëlectrolyzing at a pressure above three volts to deposit metals of the solution.

13. That step in the process of separating metals from ores and like material containing cadmium, bismuth, lead, copper, arsenic, etc., comprising electrolyzing a sulfate solution of the metals in an electrolytic bath containing an electrolyte comprising cadmium sulfate, sulfuric acid potassium sulfo-cyanate and an auxiliary electrolytic circuit to maintain the small percentage of sulfuric acid in the electrolytic bath during the electrolysis.

14. That step in the process of separating metals from ores and like material containing cadmium, bismuth, copper and like metals, comprising electrolyzing a mineral acid solution of the metals to separate bismuth and copper, electrolyzing the bismuth and copper separated solution to obtain a cadmium residue, separating and drying the cadmium residue, fluxing and melting the dried residue and casting into bullion and electrolyzing the bullion in a cadmium electrolyte to separate pure cadmium.

15. That step in the process of separating metals from ores and the like material containing cadmium, bismuth, copper, lead, arsenic and the like metals, comprising electrolyzing a sulfate solution of the metals in an electrolytic bath comprising, an auxiliary an electrolyzing circuit to maintain an acid electrolyte and an electrolyte comprising a cadmium salt, an acid and a sulfo-cyanate, to obtain a pure cadmium residue.

16. That step in the process of separating metals from ores containing cadmium, bismuth, lead, copper, tellurium, arsenic, etc., comprising oxidizing the ores, dissolving the oxidized ore in sulfuric acid, electrolyzing the sulfate solution in a quiescent bath to separate metals, and recovering arsenic and sulfuric acids from the upper layers of the electrolytic solution.

17. That step in the process of separating metals from ores containing cadmium, bismuth, lead, copper, tellurium, arsenic, etc., consisting in electrolyzing a mineral acid solution of the metals, separating pure cadmium at the cathode, recovering the anode residue, melting and casting the anode residue, electrolyzing the anode residue in a bismuth electrolyte to separate pure bismuth from the remaining metals.

18. That step in the process of separating metals from ores and the like material containing bismuth, copper, lead, tellurium, arsenic, etc., comprising electrolyzing in an electrolytic bath having a cadmium electrolyte with a cadmium bullion of metals of the ore as an electrode to separate a high percentage of the cadmium at the cathode, filtering the electrolyzed solution, drying, melting and casting the anode sludge, and reëlectrolyzing in an electrolytic bath having a cadmium electrolyte and the sludge casting as an electrode to separate more cadmium and leave an anode sludge from which bismuth may be electrolytically separated.

19. That step in the process of separating metals from ores and the like material containing cadmium, bismuth, tellurium, lead, copper, arsenic, etc., comprising electrolyzing a cadmium bullion of the metals in an electrolytic bath containing cadmium sulfate, sulfuric acid, potassium sulfo-cyanate in which the cadmium bullion is used as an anode and pure cadmium is deposited on the cathode, and regenerating sulfuric acid from the electrolyte during the electrolyzing process.

20. That step in the process of separating metals from ores and the like material containing cadmium, bismuth, lead, tellurium, copper, arsenic and the like metals, comprising electrically separating bismuth from an anode bismuth bullion containing bismuth, copper and cadmium in an electrolyzing tank having an electrolyte comprising bismuth sulfate, sulfuric acid, a sulfo-cyanate, and a clarifying agent.

21. That step in the process of separating metals from ores and the like material containing cadmium, bismuth, tellurium, lead, copper, arsenic and the like metals, comprising electrolyzing a bismuth bullion containing bismuth, copper and cadmium in an electrolyte comprising bismuth sulfate, sulfuric acid, potassium, sulfo-cyanate and glycerol, depositing pure bismuth at the cathode and metal impurities at the anode, while keeping the bath acid during the process.

22. In the process of separating metals from ores and like material containing cadmium, bismuth, copper, lead, and the like comprising, electrolyzing a solution of metals in an electrolyte comprising, a cadmium salt, an acid, and a salt of sulfo-cyanic acid.

ROYAL H. STEVENS.

Witnesses:
W. B. Joy,
L. D. Anderson.

anode and pure cadmium is deposited on the cathode, and regenerating sulfuric acid from the electrolyte during the electrolyzing process.

20. That step in the process of separating metals from ores and the like material containing cadmium, bismuth, lead, tellurium, copper, arsenic and the like metals, comprising electrically separating bismuth from an anode bismuth bullion containing bismuth, copper and cadmium in an electrolyzing tank having an electrolyte comprising bismuth sulfate, sulfuric acid, a sulfo-cyanate, and a clarifying agent.

21. That step in the process of separating metals from ores and the like material containing cadmium, bismuth, tellurium, lead, copper, arsenic and the like metals, comprising electrolyzing a bismuth bullion containing bismuth, copper and cadmium in an electrolyte comprising bismuth sulfate, sulfuric acid, potassium, sulfo-cyanate and glycerol, depositing pure bismuth at the cathode and metal impurities at the anode, while keeping the bath acid during the process.

22. In the process of separating metals from ores and like material containing cadmium, bismuth, copper, lead, and the like comprising, electrolyzing a solution of metals in an electrolyte comprising, a cadmium salt, an acid, and a salt of sulfo-cyanic acid.

ROYAL H. STEVENS.

Witnesses:
W. B. Joy,
L. D. Anderson.

---

Corrections in Letters Patent No. 1,194,438.

It is hereby certified that in Letters Patent No. 1,194,438, granted August 15, 1916, upon the application of Royal H. Stevens, of Salt Lake City, Utah, for an improvement in "Processes for Separating Metals," errors appear in the printed specification requiring correction as follows: Page 1, line 21, for the word "from" read *for;* page 4, line 17, for the word "as" read *is;* and that the said Letters Patent should be read with these corrections therein that the same may conform to the record of the case in the Patent Office.

Signed and sealed this 24th day of October, A. D., 1916.

[SEAL.]

F. W. H. CLAY,

*Acting Commissioner of Patents.*

It is hereby certified that in Letters Patent No. 1,194,438, granted August 15, 1916, upon the application of Royal H. Stevens, of Salt Lake City, Utah, for an improvement in "Processes for Separating Metals," errors appear in the printed specification requiring correction as follows: Page 1, line 21, for the word "from" read *for;* page 4, line 17, for the word "as" read *is;* and that the said Letters Patent should be read with these corrections therein that the same may conform to the record of the case in the Patent Office.

Signed and sealed this 24th day of October, A. D., 1916.

[SEAL.]
F. W. H. CLAY,
*Acting Commissioner of Patents.*